US009762291B2

(12) United States Patent
Tanner et al.

(10) Patent No.: US 9,762,291 B2
(45) Date of Patent: *Sep. 12, 2017

(54) METHODS AND APPARATUS FOR CONSUMER TESTING OF AN NFC DEVICE (71) Applicant: MasterCard International Incorporated, Purchase, NY (US)

(72) Inventors: Colin Tanner, Middlesex (GB); Aaron Concannon, London (GB); Kuljot Singh Anand, White Plains, NY (US); Anthony Lopreiato, Avon, CT (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/143,919

(22) Filed: May 2, 2016

(65) Prior Publication Data

US 2016/0248480 A1    Aug. 25, 2016

Related U.S. Application Data

(63) Continuation of application No. 14/248,073, filed on Apr. 8, 2014, now Pat. No. 9,356,710.

(51) Int. Cl.
| | |
|---|---|
| *H04B 5/00* | (2006.01) |
| *H04B 17/15* | (2015.01) |
| *H04B 17/29* | (2015.01) |
| *H04B 17/14* | (2015.01) |
| *H04B 5/02* | (2006.01) |
| *H04L 29/08* | (2006.01) |

(52) U.S. Cl.
CPC ......... *H04B 5/0031* (2013.01); *H04B 5/0056* (2013.01); *H04B 5/02* (2013.01); *H04B 17/14* (2015.01); *H04B 17/15* (2015.01); *H04B 17/29* (2015.01); *H04L 67/02* (2013.01)

(58) Field of Classification Search
CPC ...................................... H04B 17/15
See application file for complete search history.

(56) References Cited

U.S. PATENT DOCUMENTS

| | | | |
|---|---|---|---|
| 2008/0093447 A1* | 4/2008 | Johnson ................. | G06K 9/228 235/383 |
| 2013/0132218 A1* | 5/2013 | Aihara ................... | G06Q 20/20 705/21 |

(Continued)

*Primary Examiner* — Hsin-Chun Liao
(74) *Attorney, Agent, or Firm* — Buckley, Maschoff & Talwalkar LLC (57) ABSTRACT

Near-field communication (NFC) test apparatus and methods for use by a consumer to confirm the functionality of the NFC circuitry the consumer's NFC-enabled mobile device, and/or to troubleshoot NFC communications problems of the mobile device. In an embodiment, a NFC test apparatus includes a mobile device package, at least one NFC tag configured for communications with NFC circuitry of a mobile device, and a support substrate that has an indicator to ensure correct positioning of the mobile device during a self-testing procedure. In some embodiments, the NFC tag is located on the mobile device package so that an orientation of the mobile device is known during a portion of the mobile device self-testing procedure, and the support substrate is configure for supporting the mobile device during the self-testing procedure.

22 Claims, 7 Drawing Sheets

(56) References Cited

U.S. PATENT DOCUMENTS

2014/0138275 A1\* 5/2014 Magnusson ............ B65D 85/00
  206/459.1
2014/0187154 A1\* 7/2014 Sabouri ............. H04W 52/0245
  455/41.1

\* cited by examiner

FIG. 1

PRIOR ART

METHODS AND APPARATUS FOR CONSUMER TESTING OF AN NFC DEVICE

CROSS REFERENCE TO RELATED APPLICATIONS

The present continuation application is based on, and claims benefit and the priority of, U.S. patent application Ser. No. 14/248,073 filed on Apr. 8, 2014, the contents of which are hereby incorporated in their entirety for all purposes.

FIELD OF THE DISCLOSURE

In general, methods and apparatus are described for use by a consumer to test the functionality of the wireless communications hardware in his or her mobile device.

BACKGROUND

Payment cards such as credit cards, debit cards and/or prepaid cards are ubiquitous and have been used by consumers for decades. Such cards typically include a magnetic stripe which stores the relevant account number and other data. To initiate a typical purchase transaction with such a card, the card is swiped through a magnetic stripe reader that is part of a point-of-sale (POS) terminal and the reader reads the account number and other data from the magnetic stripe. The account number is then used to route a transaction authorization request that is initiated by the POS terminal. The authorization request is typically routed from the merchant's acquiring financial institution ("acquirer") to a server computer operated by or on behalf of the issuer of the payment account, and the issuer's server computer provides a response. If the authorization response indicates that the issuer authorized the transaction, the transaction is consummated at the POS terminal. The transaction is later cleared for settlement via the acquirer and the issuer.

Payment cards have been developed that allow the account number to be automatically read from the payment card by radio frequency communications. In particular, a "proximity reader" which may be incorporated with the POS terminal is configured to read the account number and/or other transaction information from the payment card. Such payment cards are often referred to as "proximity payment cards" or "contactless payment cards", and conventionally include a radio frequency identification (RFID) integrated circuit (IC, often referred to as a "chip") embedded in the payment card body. A suitable antenna is also embedded in the payment card body and is connected to the RFID chip to allow the chip to receive and transmit data by RF communication via the antenna. In typical arrangements, the RFID chip is powered from an interrogation signal transmitted by the proximity reader and received by the payment card antenna. In some embodiments, the payment card account number and other information may be uploaded from the IC payment card to the POS terminal during a purchase transaction. Authorization and clearing may then proceed in substantially the same manner as for a transaction initiated with a magnetic stripe payment card (putting aside additional security measures that may be implemented by using the processing capabilities of the IC payment card). An example of a contactless payment card standard is the "PayPass™" payment card system established by MasterCard International Incorporated, the assignee hereof. Wireless exchanges of information via NFC (Near Field Communication) have been developed for contactless or proximity payment applications.

The capabilities of a contactless payment card have been incorporated into a mobile device, such as a mobile telephone, which turns that mobile device into a contactless payment device or payment-enabled mobile device. A payment card account number and other account or device-specific information is loaded into the mobile device by a process typically referred to as "personalization". Since mobile devices, such as mobile telephones, come in many sizes and shapes (and use different operating systems), these mobile devices cannot be readily subjected to the same kind of automated personalization processes and testing that contactless payment cards typically undergo. In the case of mobile telephones, logistical problems also arise concerning transporting a mobile telephone/contactless payment device to a personalization facility either after the user has purchased the mobile telephone, or before placing the cell phone in a typical mobile telephone distribution channel. Thus, for mobile telephone/contactless payment devices that are already in a distribution channel and/or already in the user's possession, in some markets remote or "over the air" (OTA) data communications are utilized to personalize the mobile telephone/contactless payment card device by data communication, for example, via the mobile telephone network in which the phone operates or via the internet.

Many reasons may be used to explain why a payment-enabled device (for example, a mobile telephone that has been personalized so as to be capable of engaging in purchase transactions) does not work correctly when presented at a reader device, for example, in a retail store. The mobile device owner or consumer typically assumes that the payment hardware (such as NFC circuitry) of the mobile device is defective, and seeks support from the mobile device supplier. Unfortunately, since the payment hardware typically represents only short range communications functionality, it is very difficult for a consumer to be in communication with the Issuer while at the same time being present at a merchant location in order to test their device when prompted. It is also not practical for the consumer to return their device to a repair facility or to ship the mobile device back to the device supplier. Thus, the inventors recognized that a need exists for simple, cost effective and accurate apparatus and/or processes for use by consumers to test the functionality of the short range communications hardware (for example, NFC circuitry or other type of contactless communications circuitry) of their mobile devices.

BRIEF DESCRIPTION OF THE DRAWINGS

Features and advantages of some embodiments of the present disclosure, and the manner in which the same are accomplished, will become more readily apparent upon consideration of the following detailed description taken in conjunction with the accompanying drawings, which illustrate preferred and exemplary embodiments and which are not necessarily drawn to scale, wherein.

DETAILED DESCRIPTION

The capabilities of a contactless payment card have been incorporated into mobile devices, such as mobile telephones, personal digital assistants (PDAs), tablet computers and the like, in order to facilitate contactless purchase transactions for consumers. For example, mobile telephone manufacturers may include a payment processor/transceiver integrated circuit (IC) configured for contactless communications with a contactless reader device associated with a point of sale (POS) terminal of a merchant. Thus, in some embodiments the mobile telephone, which may be a "Smartphone", includes conventional mobile telephone circuitry for making wireless calls along with IC payment circuitry and/or other hardware for providing near field communication (NFC) functionality so that the mobile telephone can be used as a contactless payment device.

NFC technology complements many popular consumer level wireless technologies by utilizing key elements in existing standards for contactless card technology (for example, ISO/IEC 14443 A&B and JIS-X 6319-4). Thus, NFC-enabled mobile devices, such as NFC-enabled Smartphones, are manufactured and are compatible with existing contactless card infrastructure to enable consumers to utilize one mobile device (such as a Smartphone) across different systems (for example, as a mobile telephone, as a contactless payment device, and as a contactless identification device which can be used to gain access to buildings and/or to access transportation services and the like). It should be understood, however, that the mobile device test platform processes described herein may also be compatible and/or utilized with other radio frequency identification (RFID) technologies.

Mobile devices that may be fabricated to include contactless payment circuitry include, but are not limited to, mobile telephones, personal digital assistants (PDAs), digital music players, laptop computers and tablet computers. Examples of alternate types of form factors that may incorporate NFC circuitry configured for making contactless payments and/or for other contactless communications applications may include, but are not limited to, key fobs, wristwatches, wristbands, and stickers. Thus, such mobile devices may come in many varied sizes and shapes and may include different types of operating systems.

Before mobile devices including NFC circuitry can be used as contactless payment devices, in some embodiments an over the air (OTA) personalization process must occur. Persons skilled in the art understand that "personalization" refers to the process by which consumer or user- and/or account-specific information is loaded into and/or otherwise applied to a payment-enabled mobile device. The account-specific information may include a consumer identifier, a payment card account number associated with a payment card account, and other consumer financial account information that may be provided by an issuer financial institution (FI) computer to the mobile device and loaded into a secure memory.

Although the circuitry or hardware of mobile devices that include NFC communications circuitry can be subjected to testing before such mobile devices leave the manufacturer, a consumer who purchases a particular mobile device may still encounter difficulties when attempting to utilize that mobile device as a contactless payment device (or a contactless identification device) for many reasons. For example, a particular consumer or mobile device owner may not be handling his or her payment-enabled mobile device correctly when attempting to purchase an item, and thus the mobile device is prevented from communicating with a merchant's reader device in order to utilize the payment functionality. The consumer may, for example, may not be bringing the payment-enabled device into close enough proximity with the merchant's reader device, and/or may be tapping his or her mobile device on an incorrect portion of the reader. In another example, the consumer may have inadvertently disabled the payment functionality on his or her mobile device. To the consumer, since his or her mobile device is otherwise operating correctly (for example, the mobile telephone is operable for making wireless calls and/or texting, or the consumer's digital music player is operable to download and play music), the problem appears to be that the mobile device payment circuitry (for example, the NFC circuitry) or the payment software is not operating correctly. Thus, the consumer assumes that the NFC communications circuitry or the payment software is faulty and/or is defective, and additionally may believe that he or she is entitled to a replacement or new mobile device. However, an actual payment circuitry hardware problem and/or a contactless payment application software problem associated with any particular mobile device may only occur in a limited number of cases. Thus, the ability to troubleshoot or debug any such perceived problems and resolve them remotely is important. Consequently, many mobile device manufacturers and/or mobile device distributors provide websites that include information to help the consumer troubleshoot and/or debug such problems. Contact information may also be provided to enable consumers and/or mobile device owners to speak to customer care personnel via their mobile device and/or a landline.

Unfortunately, as NFC technology represents only short range communication functionality, it may be difficult for a consumer to test the NFC circuitry of his or her mobile device by using directions provided on a website or at the direction of a customer service representative of the mobile device supplier or manufacturer by telephone, especially if the consumer is no longer in a merchant's retail store and thus cannot attempt to make another purchase or further purchase to test the NFC circuitry and/or software. Thus, consumers are typically directed to ship the mobile device to a testing facility, which may be at the manufacturer's or device supplier's expense, and may be provided with a replacement mobile device. In addition to the shipping costs, other costs may be incurred by the mobile device manufacturer or retailer, such as costs associated with employing test personnel and providing replacement mobile devices. In addition, the consumer who purchased the mobile telephone with NFC circuitry (or NFC-enabled mobile telephone) may be unhappy and/or dissatisfied because he or she may be left without a functioning mobile device for some period of time (until a replacement arrives), which may result in the loss of that consumer as a customer.

Accordingly, disclosed herein are NFC test platforms (which may include NFC tags) and NFC test processes for use by consumers to facilitate the NFC testing of their mobile devices. Such NFC test apparatus and methods may be utilized to confirm the functionality of the NFC circuitry and/or to troubleshoot any wireless communications problems of the NFC-enabled mobile device. When NFC functionality problems are resolved by use of the NFC test platforms and testing processes described herein, then the manufacturer and/or retailer of the NFC-enabled mobile device saves money. In particular, the costs associated with shipping the consumer's mobile device to a repair facility for testing, and the costs associated with providing the consumer with a replacement NFC-enabled mobile device, are obviated by a successful diagnosis and/or fix for the consumer's payment-enabled mobile device. In addition, providing a solution while the mobile telephone is still in the consumer's possession may increase customer satisfaction.

The applicant has also developed systems and methods for easily, cost effectively, and accurately testing the validity and/or success of personalization of a user's payment-enabled mobile device. In particular, systems, apparatus and processes are disclosed in U.S. patent application Ser. No. 14/244,228, which was filed on Apr. 3, 2014, that verify that loading of a payment application has completed, that test to ensure that the payment application is functioning correctly, and that can reliably test the validity of a payment application upgrade process to ensure that it was successful and is functional before a previously loaded (and functional) payment application is deleted from a secure element of the user's payment-enabled mobile device. In addition, the systems and processes can detect errors and/or problems concerning the payment application loading process and/or payment application functionality during personalization, and in some cases can resolve such errors and/or problems automatically without the user even being aware of a problem or issue. Such systems, apparatus and processes are complimentary to those presented herein, and thus the entirety of the disclosure of U.S. patent application Ser. No. 14/244,228 is hereby incorporated by reference herein.

Figure 1:
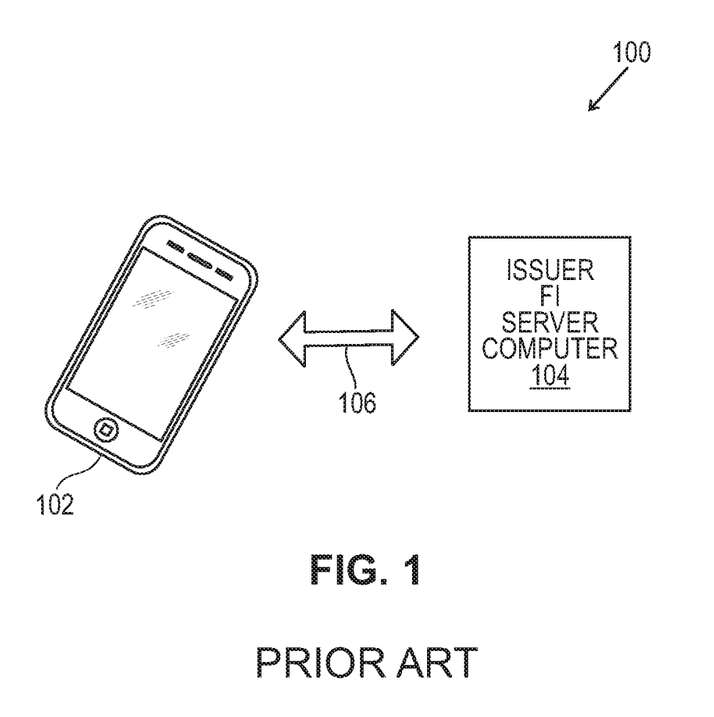
FIG. 1 is a simplified block diagram schematically illustrating a process for conducting over the air (OTA) personalization of a payment-enabled mobile device.

FIG. 1 is a simplified block diagram 100 schematically illustrating a conventional process for conducting over the air (OTA) personalization of a payment-enabled (or NFC-enabled) mobile device, such as a mobile telephone 102, so that a consumer or user can perform contactless purchase transactions. An issuer financial institution (FI) server computer 104 is operated by or on-behalf of an issuer FI of payment card accounts. The payment card issuer FI server computer 104 is the source of information that is loaded into the NFC-enabled mobile telephone 102 for the purpose of personalizing a secure element of an integrated circuit (IC) (not shown) of the mobile telephone. The Arrow 106 schematically illustrates a communication channel by which the personalization information is transmitted from the payment card issuer FI server computer 104 to the NFC-enabled mobile telephone 102, and for use to transmit feedback information concerning progress of the personalization process (for example, any error messages that may occur) from the mobile telephone 102 to the issuer FI server computer 104. The communication channel 106 may also be used to exchange other forms of data or information.

Figure 2:
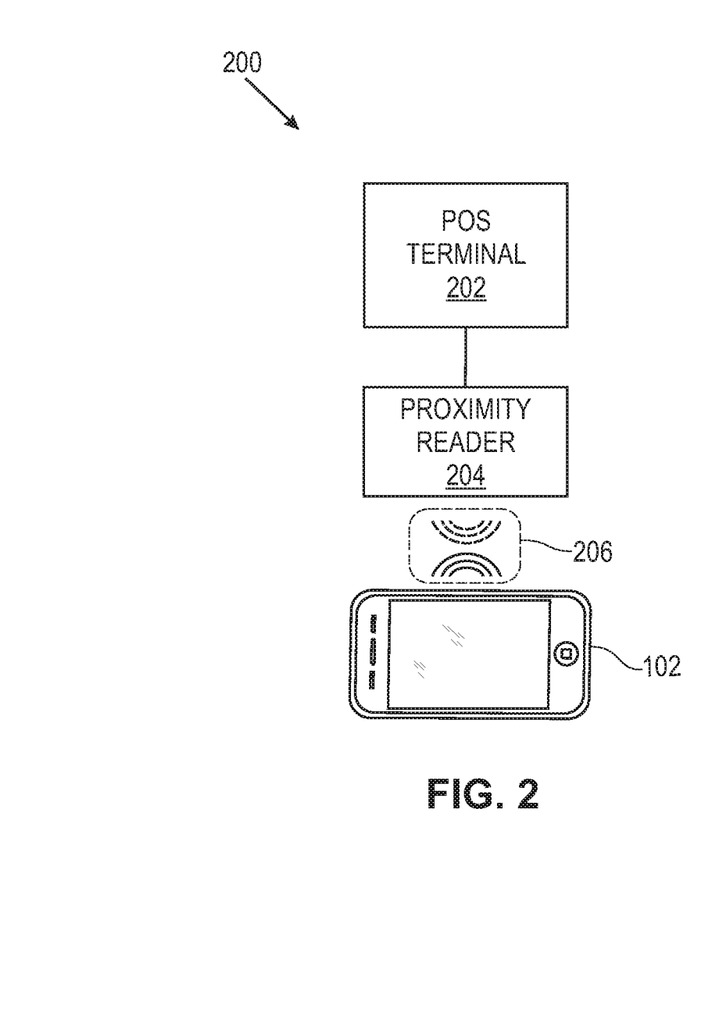
FIG. 2 is a schematic block diagram illustrating some communication aspects of a typical purchase transaction in which the payment-enabled mobile device of FIG. 1 is used.

FIG. 2 is a schematic block diagram 200 illustrating some communication aspects of a typical purchase transaction in which a payment-enabled mobile telephone 102 is used. A point of sale (POS) terminal 202 is operably connected to a contactless reader or radio-frequency (RF) proximity reader component 204. Wireless communication between the payment-enabled mobile telephone 102 and the contactless reader component 204 is indicated at 206. The wireless communication 206 may be conducted in accordance with one or more standard protocols, such as the "EMV Contactless" and/or NFC protocols, which are known to those skilled in the art.

Figure 3:
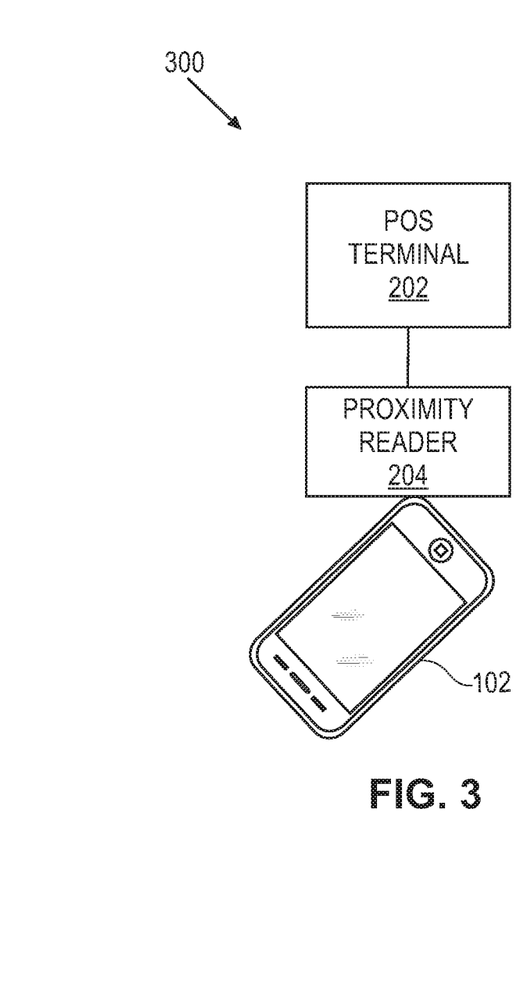
FIG. 3 is a schematic block diagram illustrating some physical aspects of a contactless or wireless purchase transaction.

FIG. 3 is a schematic block diagram 300 illustrating some physical aspects of a contactless or wireless purchase transaction. As in FIG. 2, the POS terminal 202 and its associated proximity reader component 204 are shown. The payment-enabled or NFC-enabled mobile telephone 102 is also shown in proximity to the proximity reader component 204. In a common manner of initiating the wireless communication shown in FIG. 2, the user of the NFC-enabled mobile telephone 102 briefly taps it at a particular location on the proximity reader component 204. The exact location on the proximity reader component 204 at which the NFC-enabled mobile telephone 102 should be tapped may be indicated by a standard logo affixed to the proximity reader component 204, such as the "PayPass" logo. In order to consummate a particular purchase transaction, one, two or more taps of the NFC-enabled mobile device 102 onto the proximity reader 204 may be required. The number of taps may depend upon the type or types of authorization process(es) being utilized and/or on other data, for example, the purchase transaction amount.

Figure 4:
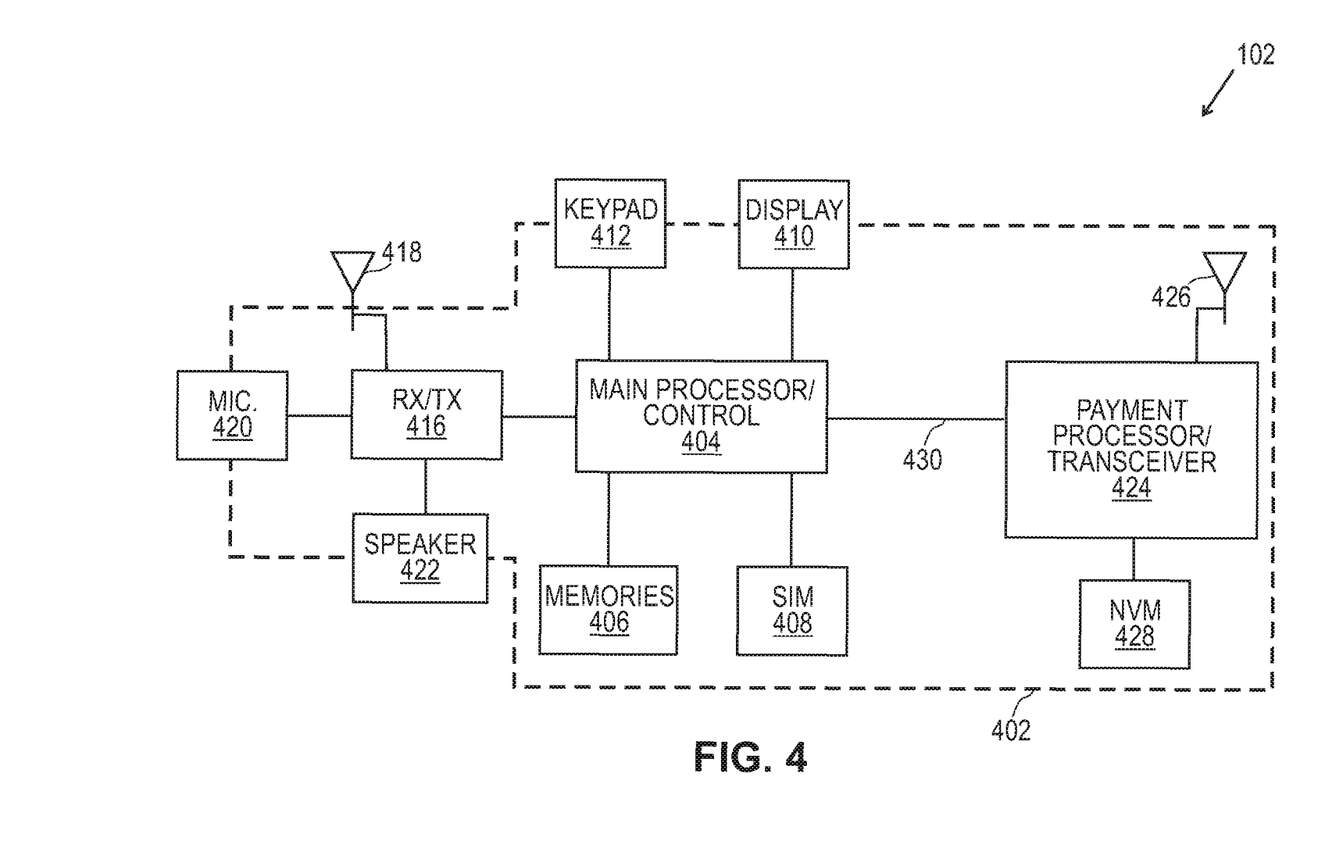
FIG. 4 is a block diagram representation of an embodiment of a payment-enabled mobile telephone in accordance with aspects of the disclosure.

FIG. 4 is a block diagram representation of an embodiment of a payment-enabled or NFC-enabled mobile telephone in accordance with aspects of the disclosure. The payment-enabled mobile telephone 102 may be conventional in its hardware aspects. For example, the mobile telephone may resemble, in most of its hardware aspects and many of its functions, a conventional Smartphone.

The mobile telephone 102 may include a conventional housing (indicated by dashed line 402 in FIG. 4) that contains and/or supports the electrical components, and the housing 402 may be shaped and sized to be comfortably held by a consumer. For example, the housing 402 may be designed to fit in the palm of the user's hand. The mobile telephone 102 further includes conventional main processor and/or control circuitry 404, for controlling the over-all operation of the mobile telephone. For example, the control circuitry 404 may include one or more conventional low-power processors that are specially designed and/or configured for functioning to send and receive wireless voice communications and text messages.

Other components of the mobile telephone 102, which are in communication with and/or controlled by the control circuitry 404, include one or more memory devices 406 (for example, program memory and/or working memory), a conventional subscriber identification module card (SIM card) 408, a keypad 412 for receiving user input, and a conventional display component 410 (which may be a touch screen) for displaying output information to the user. On some embodiments, the keypad 412 may include, for example, a conventional 12-key telephone keypad, in addition to other buttons, switches and keys, such as a conventional rocker-switch/select key combination, soft keys, and send and end keys. But as is now frequently the case, instead of a standard keypad, a smartphone provides the functionality represented by the display 410 and keypad 412 in an integrated manner via a touch screen (which is not indicated in FIG. 4 apart from blocks 410 and 412). As is known, when a consumer wishes to enter text data by using a touchscreen, a smartphone will display a virtual keyboard on the touch screen display for use by the consumer.

The payment-enabled mobile telephone 102 also includes conventional receive/transmit circuitry 416 that is also in communication with and/or controlled by the control circuitry 404. The receive/transmit circuitry 416 is coupled to an antenna 418 and provides the communication channel(s) by which the mobile telephone 102 communicates via a mobile telephone communication network operated by a mobile network operator (MNO) (not shown). The receive/transmit circuitry 416 may operate both to receive and transmit voice signals, in addition to performing data communication functions.

The payment-enabled mobile telephone 102 further includes a conventional microphone 420 operably connected to the receive/transmit circuitry 416, which is utilized to receive voice input from the user. A speaker 422 provides sound output to the user, and is also operably coupled to the receive/transmit circuitry 416.

In conventional fashion, the receive/transmit circuitry 416 operates to transmit, via the antenna 418, voice signals generated by the microphone 420, and operates to reproduce, via the loudspeaker 422, voice signals received via the antenna 418. The receive/transmit circuitry 416 may also handle transmission and reception of text messages (such as SMS messages and the like) and other data communications via the antenna 418.

The payment-enabled mobile telephone 102 may also include payment processor and/or transceiver circuitry 424 (which may be an IC) and a loop antenna 426 that is operably coupled to the payment circuitry 424. The payment circuitry 424 may include components that function to allow the payment-enabled mobile telephone 102 to operate as a contactless payment device and/or as a consumer identification device. Thus, in some embodiments the payment circuitry 424 includes one or more processors (not separately shown) and a memory (not separately shown) coupled to the processor(s) and that stores program instructions for controlling the processor(s). The payment circuitry 424 is in communication with the control circuitry 404 via a data communication connection or communication channel 430. But in some embodiments, the payment circuitry 424 and/or its processor(s) may be integrated with the main processor 404. Thus, in some implementations the functionality represented by the payment circuitry 424 may be largely implemented with a payment application program (not shown in FIG. 4) stored in memory that controls a portion of the operations or functionality of the main processor 404. The control aspect of the payment circuitry 424 may also control a transceiver (also represented by block 424) which may handle short-distance wireless communications (such as those specified by the NFC protocol) via the antenna 426.

In accordance with conventional practices and some embodiments, the payment-enabled mobile telephone 102 may include a "secure element" (not separately shown), which may be incorporated with the payment circuit 424, the main processor 404 and/or the SIM card 408. Those skilled in the art know that such a secure element may include a small processor (e.g., a microprocessor) and volatile and/or nonvolatile memory such as the non-volatile memory (NVM) 428 which is configured so as to be secure from tampering and/or unauthorized reprogramming by utilization of suitable security measures. The secure element may, for example, manage functions such as storage of the consumer's payment card account number, providing access to the payment card account number during a purchase transaction, and cryptographic processing. In addition, the secure element may store counter values and/or accumulator values that the payment-enabled mobile telephone 102 uses with respect to risk management activities.

Figure 5:
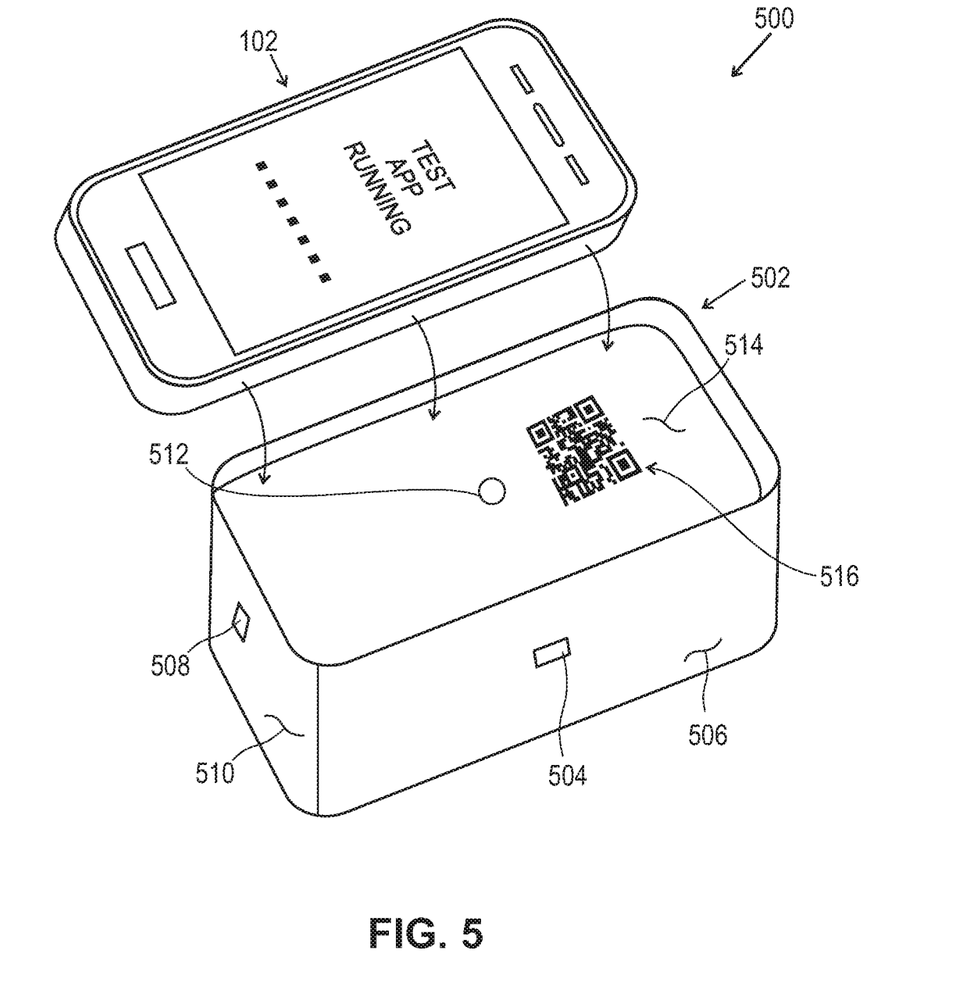
FIG. 5 is top perspective view of an NFC test platform provided to a consumer to test the NFC circuitry of a mobile device according to aspects of the disclosure.

FIG. 5 is top perspective view of an embodiment of an NFC test platform 500 that can be provided to a consumer to test the NFC circuitry of a mobile device such as a smartphone 102. In some embodiments, the NFC test platform is included within the mobile device packaging, which may include, but is not limited to, the storage box 502 in which the smartphone was shipped from the manufacturer to a retailer, or from the manufacturer to a mobile network operator (MNO), or shipped directly to the consumer. It should be understood that other forms of packaging, such as shrink-wrapped mobile device packaging or cardboard box packaging having a support substrate (which is explained below), could also be utilized as an NFC test platform.

Referring again to FIG. 5, in some implementations the storage box 502 includes one or more NFC tags 504, 508 and 512 that are positioned such that the distance and orientation from the mobile device is known during testing. The NFC tags are low-cost RFID devices that have limited functionality that typically does not include any payment functionality. In accordance with some embodiments, the NFC tags positioned in the storage box, such as NFC tags 504, 508 and 512, and are utilized only when the mobile device switches into a reader mode of operation during testing procedures, which will be explained in more detail below. In some embodiments, the reader mode of operation means that the NFC circuitry of the mobile device is switched ON so as to power and to attempt communications with the NFC tags.

The consumer typically receives the storage box 502 when he or she purchases the mobile telephone 102 (for example, when buying the mobile device at a retail location, or when the mobile device was purchased via a website and then delivered to his or her residence). As explained above with regard to FIG. 4, a mobile device such as the mobile telephone 102 includes short-distance communications circuitry (such as the payment circuitry 424) which in some implementations includes an NFC chip. Thus, in some embodiments the storage box 502 includes a first NFC tag 504 embedded within (or otherwise affixed or attached) the storage box long side wall 506 as shown, a second NFC tag 508 embedded (or otherwise affixed or attached) to the storage box short side wall 510, and a third NFC tag 512 embedded within (or otherwise affixed or attached to) a storage box support shelf 514 or insert sheet within the storage box 502. The entirety or a portion of the storage box 502, such as the support substrate, may be made of a cardboard material, a paper material, a reinforced paper material, a plastic material, a glass material, a fiberglass material, a metallic material, and/or any type of composite material. In addition, the storage box 502 includes at least one support substrate, such as the support shelf 514, capable of supporting the mobile device when it is placed on it. It should be understood that more or less of such NFC tags may be included, and that in some embodiments, one or more of the NFC tags 504, 508 and 512 may or may not be visible to the consumer. In some implementations, an indicator 516, such as a two-dimensional (2D) barcode, is provided on the surface of the support substrate 514 (which is the support shelf in the embodiment of FIG. 5). Such an indicator may also be provided on another portion or portions of the test platform, such as on one or more of the side walls 510, 516 of the storage box 502. Although a 2D barcode 516 is depicted in FIG. 5, other indicators such as a one-dimensional (1D) barcode may be used in some embodiments, and it is contemplated that a three-dimensional (3D) barcode could also be utilized in some implementations.

One dimensional barcodes, or ID barcodes, are the well-known, zebra-striped barcodes commonly utilized by the retail industry on item packaging in retail stores. ID barcodes represent data horizontally, under the form of black bars and white spaces, may include letters or numbers, and can be read by a point-of-sale (POS) reader and/or by a mobile device using the mobile device camera and a simple reader software application. 2D barcodes encode information both horizontally and vertically, in the form of rectangles forming various patterns, and thus are capable of storing thousands of characters. The recently popular "Quick Response" 2D topology, known as "QR codes," consist of an array of black and white squares that are machine-readable. QR codes can be used to store universal resource locators (URLs) and/or other information, and can easily be read by a smartphone by using a smartphone camera and a simple QR reader application. In addition, 2D barcodes offer error-correction, and thus a damaged 2D barcode can still provide information. For example, a smartphone can read a QR code, be automatically directed to particular website, and display instructions and/or a marketing message and/or other information to the user on the mobile device's display screen. 3D barcodes can resemble 2D barcodes, but in some implementations the bars and/or squares of 3D barcodes protrude from or extend from the surface at different heights. Thus, when a 3D barcode is touched by a person, a texture can be felt. The 3D barcodes are also machine readable with the height of the different features being calculated, for example, by a laser scanner as a function of the time it takes the laser light to travel to a code feature and back to a reader. Thus, for some types of 3D barcodes, a special reader device is required.

An NFC tag is a passive electronic device (it has no power source) that includes a memory, a wireless communications circuit or chip, and an antenna. NFC tags are generally small in size, inexpensive, and are formatted to be used with NFC systems to communicate and/or share information from a distance that is less than four centimeters (4 cm). Thus, NFC tags have been integrated into many different types of products such as ski lift passes, stickers, business cards, posters, and labels. Although NFC tags have bidirectional communication ability, they are generally used to provide only a reference or link information for use by online systems or to provide credentials for access control systems (such as NFC systems that control door locks and/or turnstiles) with a simple touch. During operation, an NFC tag draws power via magnetic induction from a reader device. For example, when the NFC tag is brought near to (within 4 cm) an NFC reader device, power is drawn from the reader device to energize the NFC tag such that data can be transferred between them.

Memory capacity and speed dictate the cost of an NFC tag, which may be a critical consideration when a mobile device manufacturer, for example, plans to use many NFC tags for a particular type of application. Currently, the cost of an NFC tag can range from about five cents ($0.05) to over one dollar and twenty-five cents ($1.25; U.S. currency) depending on the complexity of the design and memory capacity, but prices have been dropping recently and it is contemplated that the price should continue to fall until the least expensive NFC tags may cost only a few pennies each. As of the filing date of the present application, it is contemplated that suitable NFC tags to function as NFC tags 504, 508 and 512 may cost less than about ten cents ($0.10) and may be compliant with the ISO/IEC14443 standard.

Referring again to FIG. 5, in some embodiments, the NFC-enabled smartphone 102 includes an NFC test application that was pre-loaded by the manufacturer or device provider and that may be stored, for example, in a secure memory of the smartphone. It is contemplated, however, that the NFC test application may be downloaded to the mobile device by a user from, for example, a website or mobile device provider, when and/or if needed instead of being pre-loaded on his or her mobile device. In either case, in response to consumer input to test the NFC circuitry, the smartphone 102 initializes the NFC test application. In some embodiments, the NFC test application is operable to capture information to confirm, for example, that the NFC circuitry is enabled, whether or not that NFC circuitry has been used to perform any NFC transactions in the past, and/or whether the NFC circuitry has detected an NFC field previously. With regard to NFC circuitry transactions, a mobile device processor may be operable to retrieve NFC operation data associated with prior operation of the NFC circuitry from a memory or storage device, or the processor may function to obtain such prior NFC circuitry operation data from one or more usage logs. In some implementations, such information may be communicated to the consumer, for example, via the display screen 110 and/or may be transmitted to a remote computer or computer system utilized by the device manufacturer or device provider for testing purposes. The NFC test application may then operate to turn ON the mobile device camera and to prompt or direct the consumer to place his or her mobile device, such as the smartphone 102, face-up onto the support shelf 514 of the storage box 502 and when so placed, to tap the touch screen 110 (which is also the display screen). Alternatively, in some implementations, the user may be prompted to turn ON the camera before placing the smartphone 102 on the support shelf 514. Once the smartphone is placed back into the storage box in this manner and the consumer has tapped the display screen to indicate that it is in position, in some embodiments the NFC test application causes the smartphone 102 to enter into a reader mode of operation which powers one or more of the NFC tags 512, 504 and 508. The NFC circuitry within the smartphone, under control of the NFC test application, then attempts to communicate with one or more of the NFC tags 512, 504 and 508 in order to perform self-testing.

In some embodiments, the storage box 502 may include markings indicating exactly how and/or where the smartphone is to be positioned or oriented for NFC testing so that the smartphone will be correctly placed, and to ensure that the NFC tag(s) are a pre-determined distance from the NFC circuitry of the mobile device 102. For example, the NFC tag 512 may be positioned in the center of the support shelf 514 so that top to bottom orientation of the mobile telephone does not matter, but one or more of the NFC tags 504 and 508 may be located in offset positions so that the orientation of the mobile device is critical. Thus, for example, the support shelf 514 may include a rendering or drawing or picture or other representation of the mobile device, such as the smartphone 102, which visually indicates the position in which the mobile device should be placed by the user for testing purposes. In addition, placing an NFC tag in an offset position may provide two or more available test positions. Thus, in some implementations, an NFC test process or procedures may require placing the smartphone in more than one position or orientation on the support shelf 514 of the storage box 502 during the testing process. A multiple step NFC test process may therefore involve placing the mobile device in a first position, moving it to a second alternate position, and possibly repositioning the mobile device a third time (such as screen-side up, screen-side down, and/or in offset positions). Such multi-step NFC test procedures may be followed during the normal course of testing, and/or when more extensive testing may be required, for example, to troubleshoot a problem. In such cases, the consumer may be prompted to pick up and move the mobile device 102 one or more times during testing as directed by instructions that may appear on the mobile device display screen 110, which may include placing the mobile device on edge, or otherwise askew with regard to the walls surrounding the support shelf 512. Thus, one or more storage box support features such as shelves or inserts (not shown) may be provided for placement onto the support shelf 512 before placement of the mobile device thereon, to create additional offset positions to increase the available number of testing positions.

Furthermore, in some embodiments the storage box 502 and/or support shelf 514 may include indicators or markings that a mobile device camera (which is included in most conventional mobile telephones or Smartphones) may utilize to confirm that the mobile device has been placed in exactly the correct position. For example, during an NFC test process the mobile device camera may be turned ON by the NFC test application and if the picture depicted by the camera indicates that the mobile device is about to be placed in an incorrect position (or has been placed in an incorrect position), then the NFC test application may be operable to alert and/or inform and/or prompt the consumer via the mobile device display screen to re-orient the mobile telephone 102 to the correct position. In some embodiments, the procedures implemented by the NFC test application are designed so that even an unskilled consumer and/or unskilled cardholder can complete the NFC test process correctly. In addition, in some embodiments the NFC test application may be operable to confirm with reasonable certainty that the test steps and/or procedures were followed correctly to avoid false results. In some implementations, an indication or indications regarding the NFC test and/or NFC testing steps may be provided to the user or consumer or cardholder and/or transmitted via over-the-air (OTA) transmission and/or over the internet to other interested parties (such as the mobile device manufacturer, mobile device supplier and/or the MNO), including whether or not that the NFC test was successfully completed.

In some embodiments, the NFC test application is operable to display the NFC self-test results on the touch screen display to the consumer to verify, for example, that the NFC circuitry is functioning correctly, or that a possible problem with the hardware has been identified. If a possible problem has been detected, the consumer may be provided with instructions that may possibly solve the problem (for example, a reset procedure may be suggested), and/or the consumer may be instructed to call (or otherwise contact) a customer service representative. Depending on the severity of the problem, the customer service representative may verbally ask the consumer to retry the NFC testing, or may direct the consumer to try several different processes that may correct the issue such as powering the mobile device OFF, removing the battery, re-installing the battery and then powering the mobile device ON again. In some embodiments, the customer service representative can take control of the mobile device via the test application to conduct further testing remotely in order to diagnose the problem, and/or to recover more details from the mobile device, such as additional test information, data from mobile device usage logs, and the like. In some cases, the customer service representative may direct the consumer to return the mobile device to the manufacturer or to a repair facility for further investigation and/or repair. In cases where the consumer is directed to ship the mobile device to the manufacturer or repair facility, a shipping label may be provided via a website and/or a replacement mobile device may be provided.

Figure 6:
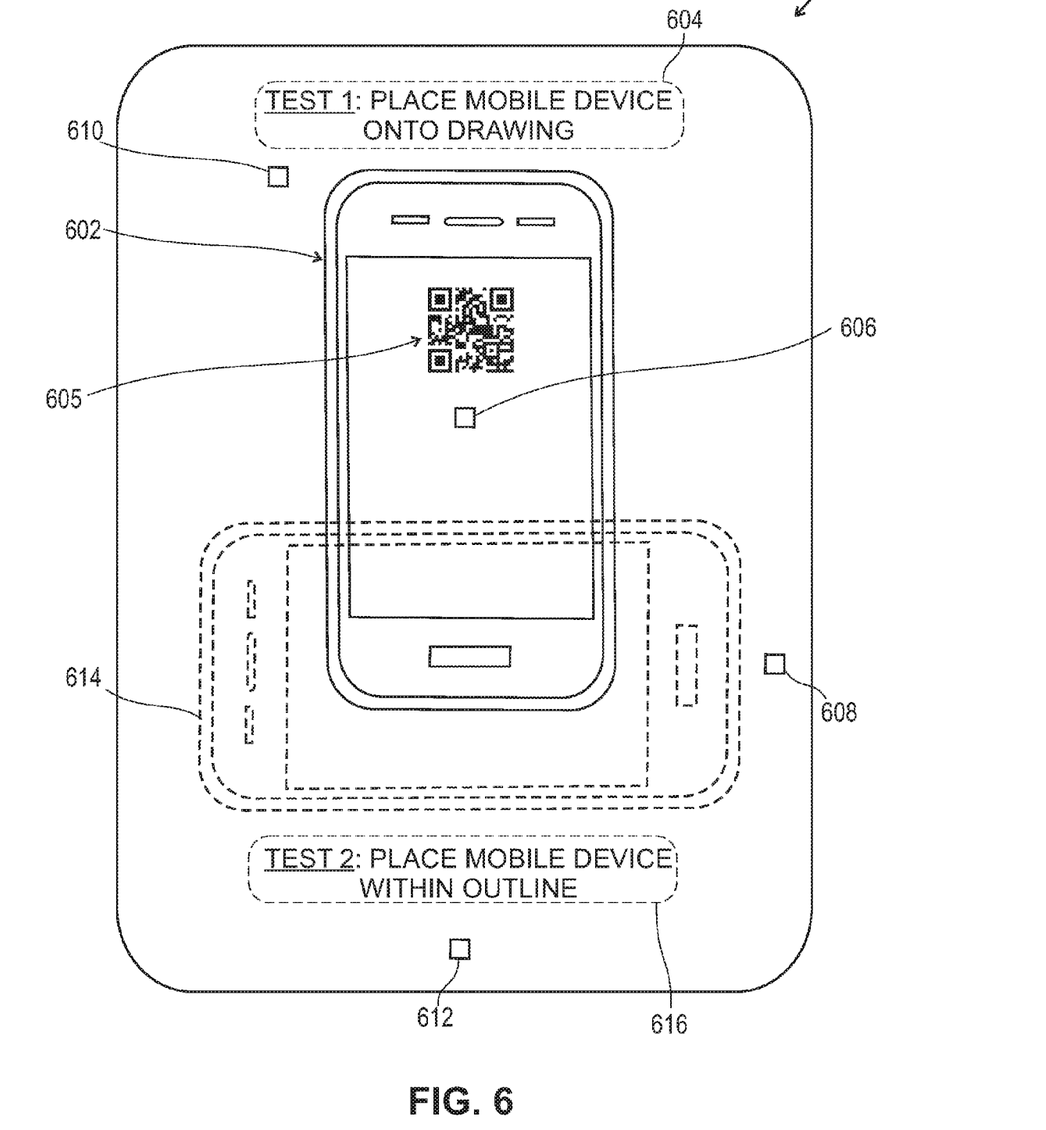
FIG. 6 illustrates an NFC test platform in the form of an NFC test sheet provided to a consumer to test the NFC circuitry of a mobile device according to aspects of the disclosure.

FIG. 6 illustrates an embodiment of an NFC test platform in the form of an NFC test sheet 600 provided to a consumer to test the NFC circuitry of a mobile device according to aspects described herein. The test sheet 600 may be shipped to a consumer along with the mobile device instead of including NFC tags in a storage box, or may be requested by the consumer, for example, by visiting a website or calling a customer service representative. The test sheet 600 may be made of a paper material, a cardboard material, a reinforced paper or cardboard material, a plastic material, a glass material, a fiberglass material, and/or any type of composite material. The illustrative embodiment of an NFC test sheet 600 shown in FIG. 6 includes NFC tags 606, 608, 610 and 612, but more or less of these NFC tags may be included. In general, the NFC test sheet 600 is inexpensive to make and designed for easy use by a consumer to test his or her mobile device. The NFC test sheet 600 also includes a two-dimensional drawing 602 of the mobile device, and can include written instructions 604 for a first test that instructs the consumer to "Place Mobile Device Onto Drawing", which drawing also shows the correct orientation for placement of the mobile device. In some implementations, an indicator 605 such as a two-dimensional (2D) barcode is also provided on the test sheet 600 within the two-dimensional drawing 602 of the mobile device. But such an indicator 605 may be provided in other portions of the test sheet 600. In some implementations, the 2D barcode may be a QR code, or may be a one-dimensional (1D) barcode or a three-dimensional (3D) barcode.

Referring again to FIG. 6, in some embodiments a second two-dimensional drawing may be included, and in this example is represented by dotted lines 614. The dotted line drawing 614 is an outline drawing of the mobile device showing the position that the consumer should place the mobile device for a second NFC test (or additional NFC testing). Instructions 616 may be included that direct the consumer to "Place Mobile Device Within Outline" when performing the second test. Such an NFC test sheet 600 may be mailed or otherwise shipped to a consumer if, for example, he or she has disposed of or lost the storage box 502 after purchasing the mobile device and/or upon request. In addition, more robust test sheets containing such NFC tags may be provided to mobile device retailers so that consumers can test the NFC circuitry capability of their mobile devices when the purchase is made in the merchant's retail store. As explained above with regard to FIG. 5, an NFC test application may be pre-loaded by the manufacturer on the mobile device and caused to function to first capture information from the mobile device 102 (to confirm, for example, that the NFC circuitry is enabled), and then to display a menu to the consumer with options including an option to select to perform an NFC test. NFC testing then may occur as described herein using one or more of the NFC tags 606, 608, 610 and/or 612, which have been positioned at predetermined, known distances from the NFC circuitry of the mobile device.

In some embodiments, instead of the NFC test application being pre-loaded onto the mobile device by the manufacturer, the consumer may be directed to visit an "App Store"

or application store (that includes various applications configured for that particular mobile device) and to download the appropriate NFC test application, which may be provided free of charge. Written instructions provided with the smartphone packaging may include such instructions, or the smartphone may be configured to prompt the consumer to download the NFC test application from an online application store. In yet another implementation, if the NFC circuitry does not appear to be working, the consumer may find instructions for downloading the NFC test application on a website, or may contact a customer service representative who orally tells the customer how to download the NFC test application. Once downloaded to the mobile device, the NFC test application may function as explained above to enable the consumer to test the NFC circuitry of his or her mobile device 102.

In yet some other embodiments, the NFC test application (whether pre-stored on the mobile device or obtained from an App Store) may function when initialized by the consumer to first capture information from the mobile device 102 regarding the NFC circuitry (for example, that it is enabled, whether or not it has been used to perform any NFC transactions and/or has detected an NFC field previously), and then to second, instruct the consumer to contact a customer service representative. Once the consumer contacts the customer service representative, for example, via a landline telephone, he or she may be asked several questions regarding the mobile device. The mobile device may also be operable to transmit data to the customer service representative including the information captured when the NFC test application was initialized. The consumer may then be verbally directed or instructed by the customer service representative to place the NFC-enabled mobile device onto the NFC test platform in one or more orientations at particular points during the NFC test (for example, onto the support shelf 514 of the storage box 502, or onto the outline illustration 602 of the test sheet 600 for a first test). The mobile device may transmit NFC test information to the customer service representative, and may also transmit data from the mobile device that indicates whether or not the consumer has correctly placed the mobile device into the storage box or test sheet. For example, the NFC test application may turn ON a camera of the mobile device, and data captured by the camera may be provided to the customer service representative during NFC testing along with NFC test results data associated with communications between one or more NFC tags and the mobile device NFC circuitry. The customer service representative may then provide verbal instructions to the consumer regarding placement and/or orientation of the mobile device, and/or when to touch the touch screen of the mobile device during NFC testing. In addition to talking the consumer through mobile device NFC testing, based on test data the customer service representative may be able to diagnose if the problem truly represents a hardware fault with the device. If a hardware failure is indicated, then the customer service representative may direct the consumer to ship the mobile device to a repair facility. However, if the problem is solved and/or the NFC circuitry is otherwise found to be operational, then the manufacturer and/or the retailer will have saved money.

In other implementations, the NFC test process may be automated by including instructions with the mobile device directing the consumer to visit a website that includes self-help instructions (thus the costs involved with hiring and maintaining customer service agents to aid consumers perform NFC testing are saved). In some embodiments, the NFC test application download and/or activation of the NFC test application may be triggered by a 3D barcode on the website that can be scanned by a camera of the consumer's mobile device.

Figure 7:
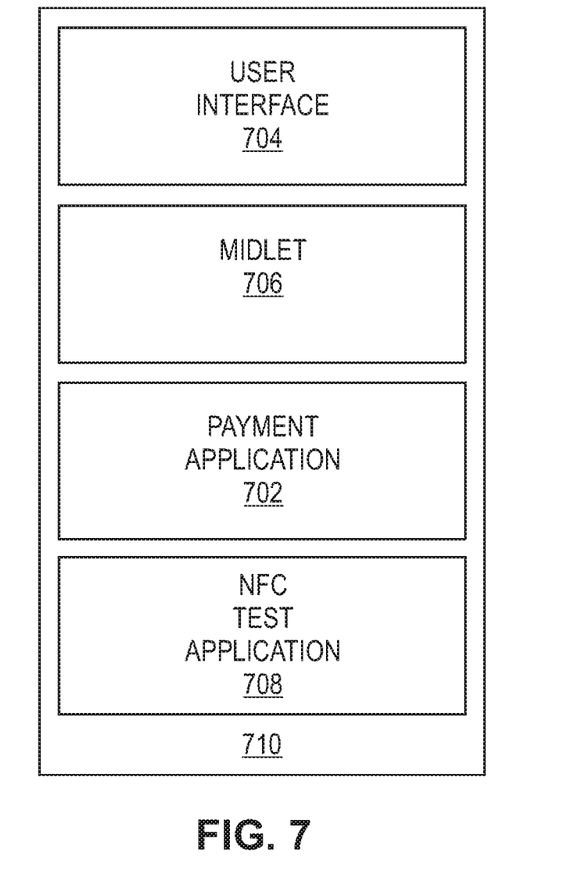
FIG. 7 is a block diagram schematically illustrating some software aspects of an NFC-enabled mobile device according to an embodiment of the disclosure.

FIG. 7 is a block diagram that schematically illustrates some software aspects of the NFC-enabled mobile telephone 102. In some embodiments, a payment application 702 may be operable in a payment mode and in a management mode. The payment application may operate in the payment mode when the payment-enabled mobile telephone is engaged in an exchange of communications with a proximity reader component 204 (see FIGS. 2 and 3) during a purchase transaction, and otherwise may be operable in the management mode. The payment application may operate in the management mode, for example, when the payment application is being configured, or when the payment application is accepting input from the user (for example, input for cardholder verification), or when the payment application is being tested to ensure successful personalization and/or to ensure a successful upgrade.

Referring again to FIG. 7, user interface software 704 may control a portion of the operations of the main processor 404 (shown in FIG. 4). For example, the user interface software 704 may receive input from, and control displaying of information on, a mobile device touch screen. Thus, the payment application program 702 and the user interface software 704 may interact with each other to allow the user or consumer to control and/or respond to the payment functionality of the payment-enabled mobile telephone 102. The interaction between the payment application program 702 and the user interface software 704 may be mediated by a software program 706 that may be referred to as a "midlet". The midlet 706 may interact with the user through the user interface (for example, a touch screen display) via the user interface software 704 to receive input such as acknowledgement (ACK) signals and/or cardholder verification method (CVM) data entry (which may include the use of a PIN and/or biometric information, and the like). The midlet 706 may instruct the payment application program 702 as to how the payment application program is to be configured in a management mode of the payment application program. Similarly, the NFC test application 708 and the user interface software 704 may interact with each other to provide the consumer with one or more prompts to initiate self-testing of the NFC hardware of the NFC-enabled mobile telephone 102. The interaction between the NFC test application 708 and the user interface software 704 may be mediated by the midlet 706, which may interact with the consumer through the user interface (the touch screen display) via the user interface software 704 to receive input, such as a tap to indicate placement of the mobile device onto a testing platform such as the support shelf 514 of the storage box 502 (see FIG. 5). The midlet 706 may then instruct the mobile device processor to enter a reader mode of operation to power up the NFC circuitry such that the NFC testing application program 708 can to attempt to communicate with one or more NFC tags associated with the NFC test platform in order to determine whether or not a problem exists with the NFC circuitry of the mobile telephone.

The payment application program 702, the user interface software 704, the midlet 706 and the NFC test application 708 may each be stored in one or more of the memory devices referred to above in conjunction with FIG. 4, and such memory devices are collectively represented by block 710 in FIG. 7. The storage device 710 is a non-transitory computer readable medium and/or any form of computer readable media capable of storing computer instructions and/or application programs and/or data. It should be understood that non-transitory computer-readable media comprise all computer-readable media, with the sole exception being a transitory, propagating signal.

In some embodiments, the NFC test application 708 may also function to store or record data concerning operation of the NFC circuitry over time in order to accumulate and/or provide data concerning NFC circuitry performance. In some embodiments, the mobile device records NFC usage data which includes use of the NFC circuitry by all mobile device applications, and stores background data, such as field strength data and electronic noise level data. Such NFC usage data and background data may be compared to predetermined and/or expected NFC usage data and background data (including field strength data and electronic noise level data) to determine if degraded NFC operation is occurring (wherein the mobile device circuitry is working, but not very well or as expected). In some embodiments, the NFC test application is configured to compare the NFC operations data stored in a memory to the expected NFC usage data at periodic intervals (for example, daily, weekly, monthly, quarterly and the like). When the results of the comparison may be indicating a reduction in NFC circuitry performance over time (as the consumer is using his or her mobile device), the NFC test application may then prompt the user to perform NFC circuitry testing and/or to contact the device manufacturer or device supplier for further information and/or instructions. In other embodiments, the NFC test application may be operable to transmit the NFC operations data stored in a memory to a remote computer for further processing regarding NFC circuitry operation, and then to receive instructions from the remote computer if and/or when warranted. The remote computer may be operated, for example, by the mobile device manufacturer or the mobile device provider.

In some embodiments, when an indication of reduced NFC circuitry performance of the mobile device is detected or determined, data and/or messages may be automatically transmitted via the mobile device to a remote computer (associated with, for example, the device manufacturer and/or device supplier). In such cases, the remote computer may operate to contact the user before the NFC circuitry performance deteriorates to the point where the mobile device can no longer be used for purchase transactions. In such cases, a text message, voice message, and/or instructions may be transmitted to the mobile device informing the user to take action such as performing NFC testing, visiting a website that provides information, and/or contacting a customer service representative.

Figure 8:
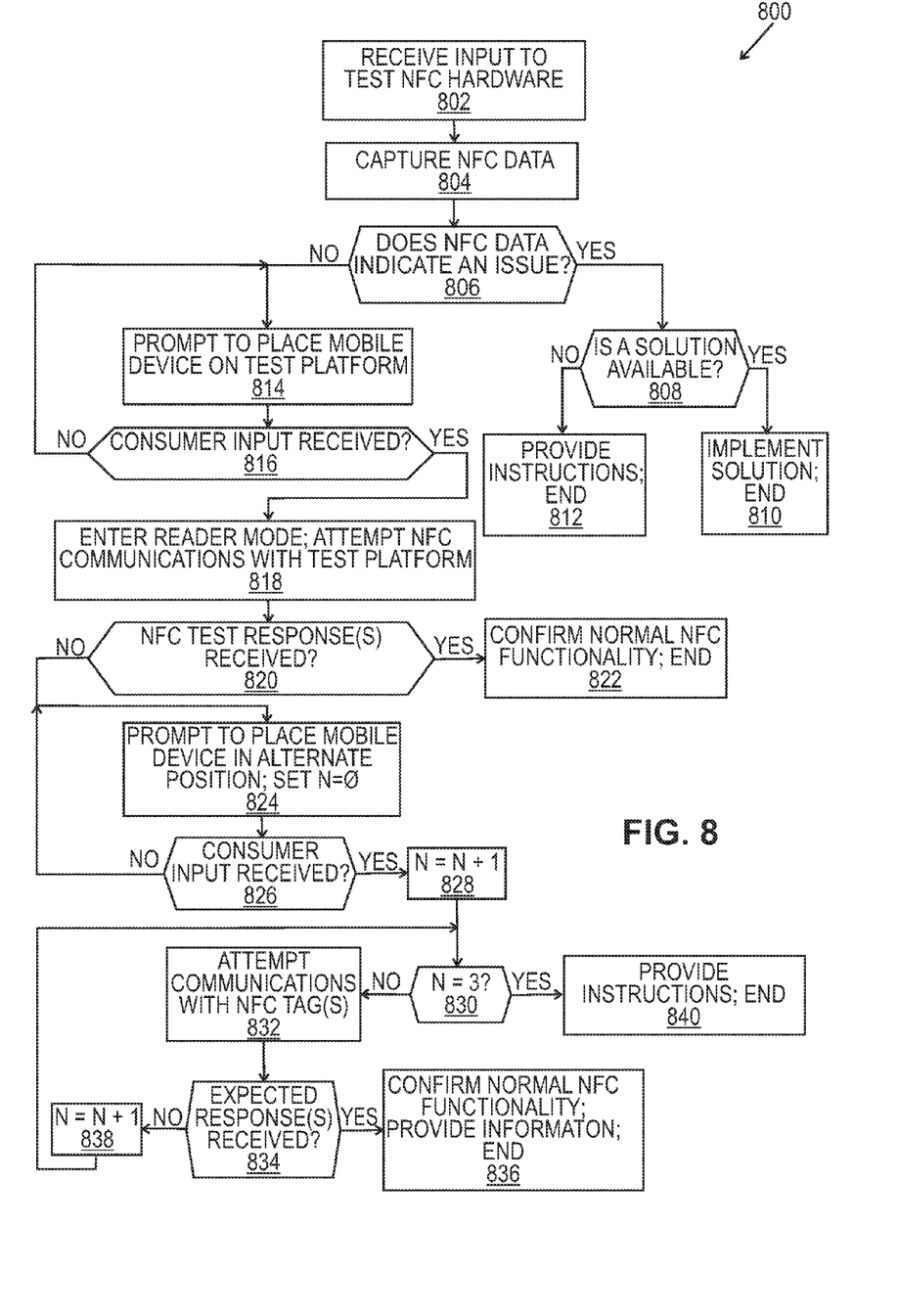
FIG. 8 is a flowchart illustrating an embodiment of an NFC testing process in accordance with an embodiment of the disclosure.

FIG. 8 is a flowchart 800 illustrating an embodiment of an NFC testing process. In step 802, a processor or control circuitry of the NFC-enabled mobile device receives consumer input to test the NFC hardware of the mobile device. The processor initializes an NFC test application which then captures 804 NFC data, such as whether or not the NFC circuitry is enabled or switched ON, whether or not that NFC circuitry has been used in the past to perform any NFC transactions, and/or whether or not the NFC circuitry has detected an NFC field previously. The processor then determines 806 if the NFC data indicates any issues or problems. If so, then the processor implements the solution and the process ends. The solution may be displaying information to the consumer that may direct the consumer to take an action, for example, directing the consumer to turn ON the NFC communication circuitry by following one or more steps. However, if a solution is not available in step 808, then in step 812 instructions are provided to the consumer, for example, to contact a customer service representative or to visit a customer care website for further information.

But if in step 806 the NFC data does not indicate a problem, then the processor prompts 814 the consumer to place the mobile device onto an NFC test platform. For example, the consumer may be directed to place the mobile telephone into the storage box 502 (see FIG. 5) in a particular orientation, or onto the NFC test sheet 600 (see FIG. 6) to cover and/or match a two-dimensional drawing. The processor may also instruct the consumer to touch the touch screen of the mobile device once the mobile device is correctly positioned for NFC testing, and thus when the processor receives 816 such consumer input then the Smartphone enters a reader mode of operation to power the NFC tags and attempts 818 NFC communications with one or more of the NFC tags positioned within the storage box 502 or on the NFC test sheet 600. For example, the processor may transmit data or a data stream to one or more of the NFC tags and expect to receive a particular type of response. But if no consumer input is received in step 816 after a predetermined amount of time, then the process may branch back to step 814 wherein the consumer is again prompted to place the mobile device onto the NFC test platform. In some embodiments, if no consumer input is received by a predetermined threshold limit (for example, fifteen seconds), then the NFC test application may terminate the process and provide an indication on the touch screen such as "NFC Test Process Terminated" for the consumer.

Referring again to FIG. 8, if the consumer has correctly placed the mobile device onto the NFC test platform and has so indicated, and if the processor receives 820 the expected responses from one or more NFC tags, then the processor may confirm 822 normal NFC circuitry functionality to the consumer by, for example, displaying a message on the touch screen such as "NFC Test Process Successfully Completed" or "NFC Hardware Operational". In some embodiments, the positive NFC test results may also be transmitted by the mobile device to the mobile telephone provider and/or manufacturer via, for example, SMS message. Moreover, additional information may be provided to the consumer, such as tips regarding how best to tap the mobile device on a proximity reader to obtain good communications.

Referring again to FIG. 8, if the expected response(s) is/are not received from one or more NFC tags in step 820, then the processor prompts 824 the consumer to place the mobile device on the NFC test platform in an alternate orientation (different than the initial placement) and to provide an indication when the mobile device is so placed by touching the touch screen. A counter "N" is also set to zero. Next, if in step 826 a consumer input is not received within a predetermined amount of time, then the process may branch back to step 824 wherein the consumer is again prompted to place the mobile device in an alternate orientation onto the NFC test platform. In some embodiments, if no consumer input is received by a predetermined threshold limit (for example, twenty seconds), then the NFC test application may terminate the process and provide an indication on the touch screen such as "NFC Test Process Terminated" for the consumer. However, if the consumer does provide an indication in step 826 that the mobile device is now placed in the alternate orientation, then in step 828 the counter "N" is increased by one so that N now equals one. Next, if the processor determines 830 that N does not equal three (3) then the processor attempts 832 communications with one or more NFC tags associated with the NFC test platform. In some implementations, if one or more expected NFC test responses are received 834 then the processor confirms 836 normal functionality, and may also provide information to the consumer and to the mobile device provider as explained above. Furthermore, in addition to notifying the consumer that the NFC hardware within the mobile device is functional, he or she may also be informed that the mobile device should be held in a particular orientation or tapped in a particular manner when being used as a payment device in order to correctly communicate data with a contactless reader device.

Referring again to FIG. 8, if the processor determines in step 834 that the expected NFC response(s) have not been received, then N (the counter) is incremented 838 by one so that now N is equal to two, and the process branches back to step 830. Since N does not equal three (it currently equals two), then the processor again attempts to communicate with the NFC tags as explained above. In some implementations, a different communication pattern may be attempted or the same process may be applied, but if the expected results are still not received in step 834 then N is again incremented by one and now equals three. Thus, when the process branches back to step 803, the processor provides 840 instructions for the consumer and the process ends. The instructions may include displaying a message on the touch screen indicating that the NFC test failed and/or that it appears that the NFC circuitry is not operational. The consumer may also be instructed to contact a customer care representative or to visit a website to obtain further instructions and/or to obtain contact information. It should be understood that the value of "N" may be more or less than "3", which value was used herein only for the purposes of illustration.

In some implementations, if initial NFC testing results are not good, or if the problem persists then data may be transmitted by the mobile device via the NFC testing application to one or more entities or third parties. For example, data concerning NFC functionality issues may be transmitted by the mobile device to a remote computer operated by the mobile device manufacturer and/or the mobile device supplier for further debugging and/or troubleshooting. As explained above, in some embodiments, the NFC test application functions to store NFC operations data over time in order to accumulate and/or provide data concerning NFC circuitry performance. In some embodiments, the mobile device records NFC usage data which includes use of the NFC circuitry by all mobile device applications, and stores background data, such as field strength data and electronic noise level data. Such NFC usage data and background data may be compared to predetermined and/or expected NFC usage data and background data (including field strength data and electronic noise level data) to determine if degraded NFC operation is occurring (wherein the mobile device circuitry is working, but not very well or as expected). In some embodiments, the NFC test application is configured to compare the NFC operations data stored in a memory to the expected NFC usage data at periodic intervals (for example, daily, weekly, monthly, quarterly and the like). When the results of the comparison may be indicating a reduction in NFC circuitry performance over time (as the consumer is using his or her mobile device), the NFC test application may then prompt the user to perform NFC circuitry testing and/or to contact the device manufacturer or device supplier for further information and/or instructions. In other embodiments, the NFC test application may be operable to transmit the NFC operations data stored in a memory to a remote computer for further processing regarding NFC circuitry operation, and then to receive instructions from the remote computer if and/or when warranted. The remote computer may be operated, for example, by the mobile device manufacturer or the mobile device provider. Furthermore, in some embodiments, the mobile device may include a mobile device NFC problems database for storing NFC circuitry issues and/or problems along with their resolutions and/or outcomes. Such a NFC problems database may be checked by the NFC test application whenever a problem arises in order to determine if the current issue seems to be associated with a former issue or problem. In such cases, the NFC test application may include instructions for contacting, for example, a remote computer operated by the mobile device supplier or the mobile device manufacturer to obtain further information and/or further instructions for performing testing actions.

Aspects of the methods described above have been disclosed with reference to an NFC-enabled mobile device such as a payment-enable mobile telephone. However, it should be understood that the principles and/or processes described in this disclosure are also applicable to other types of RFID communications technologies, and to other types of mobile devices configured to store instructions and/or data and that are operable to run a wireless communications self-test application. Any and all such electronic mobile devices, including payment-enabled mobile telephones, should be understood as included in the term "NFC-enabled mobile device".

Relative to an NFC-enabled mobile device and a contactless reader, the term "tap" refers either to brief physical contact, or to relative positioning such that wireless communication occurs.

As used herein and in the appended claims, the term "computer" should be understood to encompass a single computer or two or more computers in communication with each other or a computer network or computer system.

As used herein and in the appended claims, the term "processor" should be understood to encompass a single processor or two or more processors in communication with each other.

As used herein and in the appended claims, the term "memory" should be understood to encompass a single memory or storage device or two or more memories or storage devices. Such a memory and/or storage device may include any and all types of non-transitory computer-readable media, with the sole exception being a transitory, propagating signal.

The flow charts and descriptions thereof herein should not be understood to prescribe a fixed order of performing the method steps described therein. Rather, the method steps may be performed in any order that is practicable. In addition, the flow charts described herein should not be understood to require that all steps or elements be practiced in every embodiment. For example, one or more elements or steps may be omitted in some embodiments.

As used herein and in the appended claims, the term "payment card account" includes a credit card account or a deposit account or other type of financial account that an account holder may access. The term "payment card account number" includes a number that identifies a payment card system account or a number carried by a payment card, or a number that is used to route a transaction in a payment system that handles debit card and/or credit card transactions. The term "payment card" may include, but is not limited to a credit card, a debit card, a transit card, an identification card, a loyalty card, and/or a gift card.

As used herein and in the appended claims, the terms "payment card system" and/or "payment network" refer to a system and/or network for handling purchase transactions and related transactions, which may be operated by a payment card system operator such as MasterCard International Incorporated, or a similar system. In some embodiments, the term "payment card system" may be limited to systems in which member financial institutions (such as banks) issue payment card accounts to individuals, businesses and/or other organizations.

Although the present disclosure describes specific exemplary embodiments, it should be understood that various changes, substitutions, and alterations apparent to those skilled in the art can be made to the disclosed embodiments without departing from the spirit and scope of the disclosure as set forth in the appended claims.

What is claimed is:

1. A near-field communication (NFC) test apparatus for a mobile device comprising:
    a mobile device package;
    at least one near-field communication (NFC) tag configured for communications with NFC circuitry of a mobile device and located on the mobile device package such that an orientation of the mobile device is known during at least one portion of a mobile device self-testing procedure; and
    a support substrate associated with the mobile device package for supporting the mobile device during the self-testing procedure, wherein the support substrate comprises at least one indicator on a surface thereof to ensure correct positioning of the mobile device during the self-testing procedure.

2. The apparatus of claim 1, wherein the at least one indicator comprises a representation of the mobile device.

3. The apparatus of claim 1, wherein the at least one indicator is configured for reading by a mobile device camera.

4. The apparatus of claim 1, wherein the at least one indicator comprises at least one of a one-dimensional barcode, a two-dimensional barcode, and a three-dimensional barcode.

5. The apparatus of claim 1, wherein the at least one indicator comprises a Quick Response (QR) code.

6. The apparatus of claim 1, wherein the support substrate further comprises mobile device self-testing instructions printed thereon.

7. The apparatus of claim 1, wherein the mobile device package comprises a mobile device storage box, and the support substrate comprises a support shelf.

8. The apparatus of claim 7, wherein at least one of the mobile device storage box and the support substrate comprises a paper material, a cardboard material, a reinforced paper or cardboard material, a plastic material, a glass material, a fiberglass material, or a composite material.

9. A method for testing near-field communication (NFC) capabilities of a mobile device comprising:
    displaying, by a mobile device processor on a display component of a user's mobile device, a prompt for the user to position the mobile device onto a support substrate of a mobile device package, wherein the mobile device package comprises at least one near-field communication (NFC) tag configured for communications with NFC circuitry of the user's mobile device;
    initializing, by the mobile device processor, the NFC circuitry to power and communicate with the at least one NFC tag of the mobile device package;
    displaying, by the mobile device processor on the display component, at least one additional prompt directing the user to re-position the mobile device on the support substrate; and
    displaying, by the mobile device processor on the display component, an indication concerning functionality of the NFC circuitry comprising at least one of a message indicating successful completion of NFC circuitry testing, a message that the NFC circuitry functioned correctly, a message that the NFC circuitry failed to function correctly, and a message instructing the user to contact customer support of at least one of a device manufacturer and a device supplier.

10. The method of claim 9, wherein the prompt to position the mobile device onto the support substrate of the mobile device package comprises instructions for the user to position the mobile device on at least one indicator on a surface of the support substrate.

11. The method of claim 9, further comprising, prior to displaying the prompt to position the mobile device on the support substrate:
    receiving, by the mobile device processor, a request to test contactless communications functionality of the NFC circuitry of the mobile device; and
    retrieving, by the mobile device processor, NFC usage data and background data from a memory of the mobile device.

12. The method of claim 11, further comprising:
    transmitting, by the mobile device processor to a remote computer, the NFC usage data, the background data, and data indicating the functionality of the NFC circuitry;
    receiving, by the mobile device processor from the remote computer, instructions for remotely controlling the mobile device via an NFC test application; and
    executing, by the mobile device processor, the remote control instructions enabling remote diagnosis of an NFC circuitry problem.

13. The method of claim 9, further comprising, subsequent to displaying the prompt for the user to position the mobile device onto the support substrate of the mobile device package:
    initializing, by the mobile device processor, a mobile device camera;
    receiving, by the mobile device processor, visual data from the mobile device camera associated with positioning of the mobile device on the support substrate; and
    determining, by the mobile device processor from the visual data, that the mobile device is correctly positioned on the support substrate.

14. The method of claim 13, wherein the visual data comprises data associated with at least one of a barcode and a representation of the mobile device on the support substrate.

15. The method of claim 9, further comprising, subsequent to displaying the prompt for the user to position the mobile device onto the support substrate:
    initializing, by the mobile device processor, a mobile device camera;
    receiving, by the mobile device processor, visual data from the mobile device camera associated with positioning of the mobile device on the support substrate;
    determining, by the mobile device processor from the visual data, that the mobile device is incorrectly positioned; and
    displaying, by the mobile device processor, a message on the display component directing the user to reposition the mobile device on the support substrate.

16. The method of claim 15, wherein the visual data comprises at least one of a barcode and a representation of the mobile device on the test substrate.

17. The method of claim 15, wherein the visual data comprises data associated with at least one of a two-dimensional barcode and a three dimensional barcode, and further comprising:
   reading, by the mobile device camera, barcode data comprising a uniform resource locator (URL); and
   displaying, by the mobile device processor on the display component, a website associated with the URL providing further instructions for the user.

18. The method of claim 15, further comprising:
   transmitting, by the mobile device processor to a remote computer, the visual data; and
   receiving, by the mobile device processor from the remote computer, at least one of instructions concerning further NFC test procedures and a message for display on the display component instructing the user to reposition the mobile device on the test substrate.

19. The method of claim 9, further comprising transmitting, by the mobile device processor to a remote computer, at least one of NFC circuitry operation data and at least one response of the at least one NFC tag.

20. The method of claim 19, further comprising:
   receiving, by the mobile device processor, data from the remote computer concerning analysis of the NFC circuitry; and
   displaying, by the mobile device processor on the display component, instructions for the user regarding the NFC circuitry test.

21. The method of claim 9, further comprising:
   storing, by the mobile device processor in a storage device, NFC usage data and background data associated with mobile device NFC circuitry performance over time;
   determining, by the mobile device processor, a reduction in NFC circuitry performance; and
   at least one of:
      displaying, by the mobile device processor on the display component, at least one message; and
      transmitting, by the mobile device processor, the NFC usage data and background data to a remote computer.

22. The method of claim 21, wherein the at least one message comprises at least one of instructions directing the user to perform further NFC test procedures, to visit a website for information, and to contact a customer service representative.

* * * * *